(No Model.)
H. M. COOPER.
CHURN.
No. 430,174. Patented June 17, 1890.
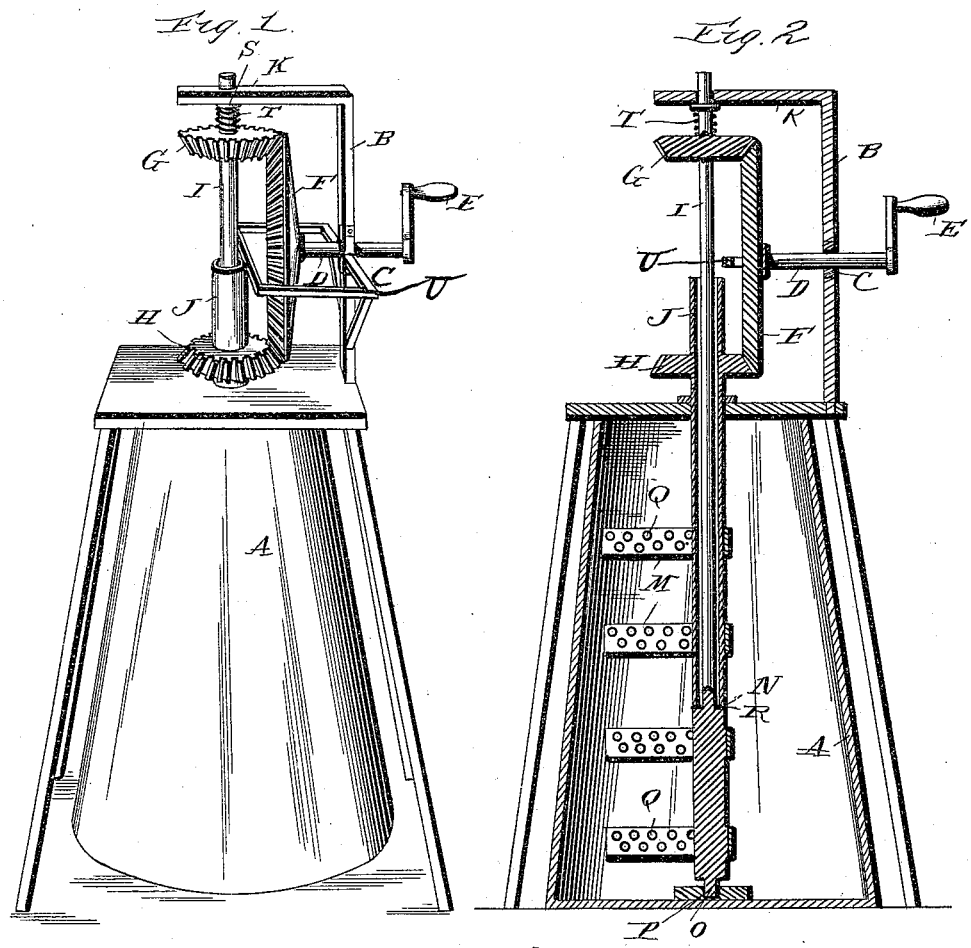
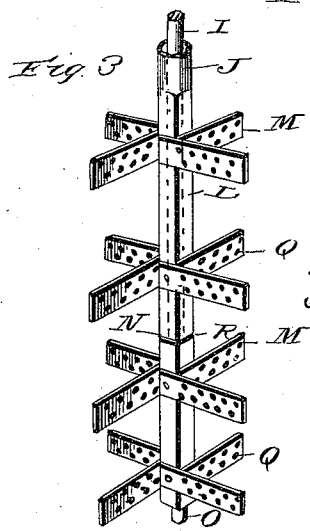
Witnesses:
Hugh M. Cooper
Inventor
By W. T. Fitzgerald
Attorney

UNITED STATES PATENT OFFICE.

HUGH M. COOPER, OF HUMPHREYS, MISSOURI.

CHURN.

SPECIFICATION forming part of Letters Patent No. 430,174, dated June 17, 1890.

Application filed December 26, 1889. Serial No. 334,982. (No model.)

*To all whom it may concern:*

Be it known that I, HUGH M. COOPER, a citizen of the United States, residing at Humphreys, in the county of Sullivan and State of Missouri, have invented certain new and useful Improvements in Churns; and I do hereby declare the following to be a full, clear, and exact description of the invention, such as will enable others skilled in the art to which it appertains to make and use the same.

My invention relates to improvements in churns; and it consists in certain novel features which will be hereinafter described and claimed.

In the accompanying drawings, Figure 1 is a perspective view of my improved churn. Fig. 2 is a vertical section of the same. Fig. 3 is a detail perspective view showing the construction of the dasher.

The churn-body A may be of the usual or any preferred construction, and on the lid of the churn near the edge of the same I erect the standard B, to the side of which I secure the journal-box C, in which the dasher-shaft D is mounted, the said driving-shaft being provided with the crank arm or handle E at one end, as shown. On the inner end of the driving-shaft I secure the driving crown-wheel F, which meshes with the upper and lower gear-wheels G H, which are secured to the inner and outer dasher-shafts I J, respectively. A vertical arm K projects from the standard B, and the dasher-shafts are journaled in the said frame. The outer shaft J is hollow, and the inner shaft I is solid and passes through the hollow shaft. The lower ends of both shafts are enlarged and are angular in cross-section, so as to provide a number of faces L, to which the dasher-blades M may be secured, and the enlarged formation of the lower end of the shaft I provides a shoulder N, on which the lower end of the hollow shaft rests. The lower end of the solid shaft is provided with a pin or pintle O, which is stepped in a socket P on the bottom of the churn, thereby steadying the dasher and holding it in a true vertical position. The dasher-blades M are arranged at reverse angles, so as to act on the cream and throw the same in contrary directions, and consequently thoroughly agitate the same, so as to quickly produce the butter, and they are provided with a number of perforations Q, so as to divide the cream into a number of small streams and thereby thoroughly break up all the globules. A washer R is fitted around the solid shaft I above the shoulder N, so as to prevent the cream entering the hollow shaft and accumulating therein so as to make the operation of the churn difficult, and a washer S is fitted in the upper end of the hollow shaft, so as to hold it concentric with the solid shaft. A coiled spring T is arranged around the solid shaft between the arm K and the pinion G, so as to prevent the said pinion rising from engagement with the driving-wheel, as will be readily understood. A horizontal frame U is secured to the standard B, so as to protect the driving-wheel from injury.

In practice the cream is placed in the churn-body. The several parts are then fitted together, as shown and above described, after which the driving-shaft is rotated, so as to set in motion the dashers and thereby agitate the cream. It will be readily seen that the dashers will be rotated in contrary directions, and consequently, instead of causing a circular movement of the cream in unison with the dashers, will create reverse currents in the cream, which will tend to neutralize each other, and consequently the cream will be thoroughly agitated and the butter quickly formed. After the butter has been formed, the outer hollow shaft is raised, so as to disengage the pinion H from the driving-wheel, and the driving-wheel is then again rotated, so that the lower dasher will revolve and gather the butter.

My improved churn is very simple in its construction, and the several parts are compactly arranged, so that it can be easily operated, and consequently effects a saving of labor as well as an economy of time. By lifting the lid from the churn-body the entire operating mechanism will be removed, so that the body can be easily cleaned, and it will also be noticed that the several parts of the mechanism are detachable, so as to facilitate cleaning and repairing.

Having thus described my invention, what I claim, and desire to secure by Letters Patent, is—

As an improvement in churns, the combination of the lid resting on the churn-body, the frame B, rising from the lid, the hollow shaft journaled in the lid and extending into the churn-body and provided with a pinion on its upper end, the solid shaft passing through the hollow shaft, journaled in the frame B, and having a pinion on its upper end, the spring arranged around said shaft and bearing upon the pinion thereon, the driving-shaft mounted on the frame B and having a driving-wheel at its inner end meshing with the pinions on the hollow and solid shafts, and the horizontal frame U, secured to the frame B and surrounding the driving-wheel, as specified.

In testimony whereof I affix my signature in presence of two witnesses.

HUGH M. COOPER.

Witnesses:
J. W. CONDUIT,
R. A. COLLIER.